Patented Dec. 25, 1923.

1,478,463

UNITED STATES PATENT OFFICE.

ERNEST H. VOLWILER, OF CHICAGO, ILLINOIS, ASSIGNOR TO THE ABBOTT LABORATORIES, OF CHICAGO, ILLINOIS, A CORPORATION OF ILLINOIS.

HYPNOTIC AND ANALGESIC COMPOUND.

No Drawing.  Application filed June 19, 1922.  Serial No. 569,560.

*To all whom it may concern:*

Be it known that I, ERNEST H. VOLWILER, a citizen of the United States of America, residing at Chicago, in the county of Cook and State of Illinois, have invented certain new and useful Improvements in Hypnotic and Analgesic Compounds, of which the following is a specification.

My invention relates to the production of compounds by combining dimethyl-amino-phenyl-dimethyl-pyrazolon with a dialkyl barbituric acid or a derivative thereof, and of the general formula

where R and R' are alkyl groups, one of which is larger than ethyl, and where X is hydrogen or a substitute therefor.

*General method of synthesizing compounds of this series.*

One mole of a dialkyl barbituric acid, or a derivative thereof, and two moles of dimethyl-amino-phenyl-dimethyl-pyrazolon, i. e. "amidopyrin," are dissolved in a small quantity of a suitable solvent, such as alcohol or acetone, and heated to the boiling point of the solvent. When most of the latter has escaped, the temperature is raised to about 100° C., taking care not to exceed 108° C. The product turns to a dark yellow color, and melts completely. After keeping at this temperature for a short time, it is allowed to cool, whereupon it crystallizes to a bright yellow solid.

The resultant product is a compound of one molecule dialkyl-barbituric acid and two molecules of dimethyl-amino-phenyl-dimethyl-pyrazolon. That this type of substance is actually a definite chemical compound and not merely a mixture of the components, may readily be shown by both chemical and pharmacological tests.

*Specific compounds.*

*Example No. 1.*—4.80 grams (1 mole) (di-n-butyl barbituric acid) and 9.24 grams dimethyl-amino-phenyl-dimethyl-pyrazolon (2 moles) are each dissolved separately in 20 cc. of hot alcohol, the solutions mixed, filtered, and put into a flask. This is heated in an oil bath, beginning at about 90° and raising the temperature to 100° in the course of a half hour. After keeping at this temperature for 15 minutes after the solvent has escaped, the yellow liquid is allowed to cool and quickly crystallizes to a cream-colored solid, melting at 94.5°–96.5° C.

*Example No. 2.*—4.24 grams (1 mole) ethyl-n-butyl barbituric acid and 9.24 grams (2 moles) dimethyl-amino-phenyl-dimethyl-pyrazolon are each dissolved separately in 20 cc. hot alcohol, the solutions mixed, filtered, and heated as in Example 1. An orange-yellow solid is obtained, melting at 88°–90° C.

*Example No. 3.*—4.24 grams (1 mole) ethyl secondary-butyl barbituric acid and 9.24 grams (2 moles) dimethyl-amino-phenyl-dimethyl-pyrazolon are caused to react as described in Example 2. The product is an orange-yellow solid melting at 84°–86° C. (Ethyl secondary-butyl barbituric acid has not previously been described in the literature. It may be prepared by condensing ethyl secondary-butyl malonic acid ethyl ester, having a boiling point at 133° at 48 mm., with urea in the presence of sodium ethylate. The resultant ethyl secondary-butyl barbituric acid is a white solid melting at 158° C.)

*Example No. 4.*—4.42 grams (1 mole) ethyl isoamyl barbituric acid and 9.24 grams (2 moles) dimethyl-amino-phenyl-dimethyl-pyrazolon are caused to react as described in Example 1. The product is an orange-yellow solid having the melting point 90°–94° C. (Ethyl isoamyl barbituric acid has not previously been described in the literature. It may be prepared by condensing ethyl isoamyl malonic acid ethyl ester—which has a boiling point of 260° C. at 750 mm.—with urea and sodium ethylate. The resultant ethyl isoamyl barbituric acid is a white solid melting at 145°–146° C.)

The condensation products of dialkyl barbituric acids with dimethyl-amino-phenyldimethyl-pyrazolon are yellow or yellowish solids of relatively low melting points, readily soluble in most of the common organic solvents, almost insoluble in cold water, and readily soluble in hot water. When heated with aqueous solutions of mineral acids they undergo decomposition, yielding the original components.

These compounds are remarkable for their strong analgesic action together with their marked hypnotic power, such properties being much more pronounced than with mixtures of the component substances, and have a lower toxicity than such mixtures.

The scope of the invention should be determined by the language of the appended claims which should be interpreted as broadly as possible consistent with the state of the art.

I claim as my invention:

1. As a new article of manufacture, a compound having the general formula:

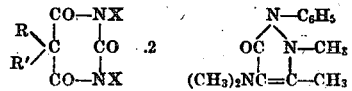

where R and R' represent alkyl groups, one of which is greater than ethyl, and where X is H or a substitute therefor.

2. As a new article of manufacture, a compound having the general formula:

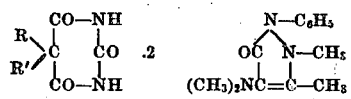

where R and R' represent alkyl groups, one of which is greater than ethyl.

ERNEST H. VOLWILER.